(12) United States Patent
Persson et al.

(10) Patent No.: US 8,249,761 B2
(45) Date of Patent: Aug. 21, 2012

(54) METHOD AND A CALCULATING UNIT FOR CALCULATION OF A RECOVERY FLIGHT PATH

(75) Inventors: Hasse Persson, Linköping (SE); Jonas Lovgren, Linköping (SE)

(73) Assignee: Saab AB, Linköping (SE)

( * ) Notice: Subject to any disclaimer, the term of this patent is extended or adjusted under 35 U.S.C. 154(b) by 607 days.

(21) Appl. No.: 12/499,350

(22) Filed: Jul. 8, 2009

(65) Prior Publication Data

US 2010/0010693 A1    Jan. 14, 2010

Related U.S. Application Data

(62) Division of application No. 11/383,966, filed on May 18, 2006, now Pat. No. 7,571,878.

(30) Foreign Application Priority Data

Jun. 22, 2005   (EP) .................................... 05105536

(51) Int. Cl.
G05D 1/00 (2006.01)
B64C 13/18 (2006.01)
(52) U.S. Cl. ......... 701/6; 701/5; 701/7; 701/8; 244/175; 244/181
(58) Field of Classification Search .................. None
See application file for complete search history.

(56) References Cited

U.S. PATENT DOCUMENTS

| | | | |
|---|---|---|---|
| 4,916,448 A * | 4/1990 | Thor | 340/970 |
| 4,924,401 A | 5/1990 | Bice et al. | |
| 5,136,512 A | 8/1992 | Le Borne | |
| 5,166,682 A | 11/1992 | Bateman | |
| 5,486,821 A * | 1/1996 | Stevens et al. | 340/970 |
| 5,677,842 A | 10/1997 | Denoize | |
| 6,201,482 B1 * | 3/2001 | Schiefele et al. | 340/961 |
| 6,538,581 B2 | 3/2003 | Cowie | |
| 2003/0036828 A1 | 2/2003 | Conner et al. | |

FOREIGN PATENT DOCUMENTS

EP    1329863 A1    7/2003

* cited by examiner

Primary Examiner — Khoi Tran
Assistant Examiner — Bao Long T Nguyen
(74) Attorney, Agent, or Firm — Venable LLP; Eric J. Franklin

(57) ABSTRACT

The invention relates to a method for calculating a flight path avoiding a collision with the ground when an aircraft dives towards the ground. The method includes receiving signals including information of a dive angle of the aircraft in relation to the imaginary ground plane, and a present roll angle of the aircraft, and calculating a flight path that avoids collision with the ground on the basis of the information. The calculation includes calculating a need for rolling the aircraft based on the present roll angle, and calculating a need for changing the direction of the velocity vector of the aircraft so that the change has a component in an upward direction in relation to the reference frame of the aircraft. The calculation of the need for rolling the aircraft is also based on the dive angle so that the calculated flight path turns sideways when the dive angle surpasses a specified dive angle and when the present roll angle is larger than zero degrees, and so that the flight path continues in a forward direction when the dive angle is below the specified dive angle. The invention also relates to a ground collision calculating unit, a computer program, and a computer readable medium.

11 Claims, 5 Drawing Sheets

METHOD AND A CALCULATING UNIT FOR CALCULATION OF A RECOVERY FLIGHT PATH

CROSS-REFERENCE TO RELATED APPLICATIONS

This application is a divisional application of co-pending U.S. patent application Ser. No. 11/383,966 filed May 18, 2006, now U.S. Pat. No. 7,571,878 and claims priority to European patent application 05105536.6 filed Jun. 22, 2005.

FIELD OF INVENTION

The present invention relates to a method and a calculating unit for calculation of a flight path avoiding a collision with the ground when an aircraft dives towards the ground.

BACKGROUND OF THE INVENTION

When an aircraft dives towards the ground the aircraft may crash if the pilot, or an autopilot, does not avoid the collision. To increase the safety it is known to calculate a recovery flight path, which evades collision with the ground. For high-performance aircrafts it is also known to calculate or to simulate an altitude or a point of time at which an evasive action must be initiated. Such a calculation system is particularly useful when the diving path is steep or when the aircraft dives inverted. In the latter case the aircraft is first rolled to wings level, after which the aircraft is pitched upwards. Such a recovery flight path is called a zenith recovery flight path and is shown in FIG. 1 marked with the reference letter A. When an aircraft dives steeply and inverted it may in some instances be better to continue the diving path by pitching the aircraft at once. The aircraft then first descends more steeply, turns backwards in a loop-like flight path and ascends in the other direction so that a collision with the ground is avoided. Such a flight path is called a nadir recovery flight path and is also shown in FIG. 1 marked with the reference letter B.

For high performance aircrafts, such as military aircrafts, it is necessary to take both the zenith and the nadir recovery flight paths into account. In this case a number of problems occur. To calculate a recovery flight path demands a lot of computational power, which always is in shortage. To make a calculation for both types of flight paths demands twice as much computational power as when calculating only one flight path. In addition the two different flight paths must be compared with each other in order to choose the best one, which also demands computational power, and, if the comparison is inconclusive, the system may switch back and forth between the two recovery flight paths. The computation is then in danger to give contradictory answers which can be dangerous. Furthermore, the nadir recovery flight path B, may in some instances in itself cause a collision with the ground since the aircraft dives even more steeply in the beginning of the flight path.

SUMMARY OF THE INVENTION

The object of the present invention is to indicate an improvement in the calculation of a recovery flight path for an aircraft, which avoids a collision with the ground, such that the need for computational power decreases.

According to one aspect of the invention this object is achieved with the ground collision calculating unit.

According to another aspect of the invention this object is achieved with a method.

According to yet another aspect of the invention this object is achieved with a computer program.

According to yet another aspect of the invention this object is achieved with a computer readable medium.

According to the invention the need for rolling the aircraft is calculated based on the dive angle as well as the present roll angle, and the flight path is calculated so that it turns sideways when the dive angle surpasses a specified dive angle and when the present roll angle is larger than zero degrees. Thus the calculated flight path does not necessarily continue in the forward direction as for the zenith case, or loop backwards as in the nadir case, but may take an intermediate path between the zenith and the nadir paths by turning sideways in relation to the forward direction of the aircraft. Preferably the flight path is calculated so that the flight path turns only slightly sideways for small dive angles, and increasingly sideways for larger dive angles. Preferably the flight path is calculated so that the flight path turns sideways in such a degree that the flight path turns backwards for very high dive and roll angles. Thus according to the invention the zenith and the nadir cases are brought together by intermediate flight paths, which turn sideways. Thus it is no longer necessary to calculate two different recovery flight paths, one for the zenith case and one for the nadir case. Instead only one flight path, which turns increasingly sideways from a zenith flight path towards a nadir flight path for increasingly higher dive and roll angles needs to be calculated. The method according to the invention is thus applicable for all dive angles and roll angles.

Since only one recovery flight path needs to be calculated, the need for computational power is reduced considerably. It is no longer necessary to calculate two different flight paths, nor is it necessary to compare two different flight paths, meaning that the comparison calculation also can be omitted, reducing the need for computational power. Safety increases, since there is no risk that the system switches between the two different flight paths in the middle of an evasive maneuver. A further advantage is that the recovery flight path, and thus the loss of altitude belonging to the recovery flight path, is changed continuously as a function of the dive angle and the roll angle. Alterations of the dive and roll angles thus do not give any steps in the loss of altitude, which gives the pilot a chance to react consistently to such changes. Furthermore, by using the invention, it is only necessary to test and verify one computational model for a specific aircraft.

The dive angle is defined relative to an imaginary ground plane. A dive angle of zero degrees here means that the aircraft is flying in parallel with the ground plane and is not diving. A dive angle of 90 degrees means that the aircraft is diving straight down towards the ground plane. The imaginary ground plane may be the real ground plane as measured by radar, or may be an electronic ground plane, for example a map of the landscape wherein the present imaginary ground plane is taken as a portion of the map as given by the position of the aircraft, measured for example by GPS. In a preferred embodiment the imaginary ground plane is defined as a horizontal plane at an altitude given by the average height of the surrounding ground and possibly including a safety distance. In this embodiment a dive angle of 90 degrees means that the aircraft is diving vertically. Other known methods for calculating a ground plane are also within the scope of the invention. Furthermore, several different imaginary ground planes may be used for different purposes, for example, one imaginary ground plane may be used to calculate the dive angle and another imaginary ground plane may be used for calculating the altitude.

The roll angle is in this application defined by projecting the aircraft onto the velocity vector of the aircraft, wherein the roll angle is the angle between the tail fin and a vector which is perpendicular to the velocity vector and which is pointing upwards. The aircraft is thus considered from behind in the direction of the velocity vector. The roll angle is here defined to be zero degrees when the aircraft is at wings level and 180 degrees when the aircraft is inverted. With a forward direction of the velocity vector is meant the direction of the original velocity vector projected onto the imaginary ground plane. The flight path A in FIG. 1 is thus continued in the forward direction, while the flight path B in FIG. 1 is turned backwards.

A calculated flight path may comprise a number of points in space through which the aircraft moves. The flight path may also comprise values such as the velocity vector, roll angle of the aircraft, and different accelerations ascribed to each point. In another embodiment the flight path may comprise values of the velocity vector, roll angle of the aircraft, and different accelerations as a function of time, wherein the flight path through the air is achieved by integrating said values. The calculated flight path may also be a continuous line.

In one embodiment of the invention said specified dive angle is equal to or larger than 50°. Preferably the specified dive angle is larger than or equal to 60°, more preferably larger than or equal to 65°, and most preferably larger than or equal to 70°. These values for said specified dive angle has been shown to be efficient in bringing the zenith and nadir flight paths together by intermediate flight paths that turns sideways.

According to another embodiment of the invention the calculation of the need for rolling the aircraft comprises reducing the need for rolling the aircraft below the value of the present roll angle when the dive angle surpasses said specified dive angle. Thus the aircraft is rolled through an angle, which is smaller than the present roll angle, meaning that the aircraft remains slightly rolled. This gives the advantage that the aircraft will turn sideways more easily.

According to another embodiment the calculation of the need for rolling the aircraft comprises multiplying the present roll angle of the aircraft with a rolling coefficient, which has a numerical value which is dependent on the dive angle such that the rolling coefficient is smaller than one when the dive angle surpasses said specified dive angle. It is simple to accomplish a multiplication in a computational system, and thus the computational power needed to calculate the need for rolling the aircraft becomes small. In addition the reliability of the calculation increases. By using such a rolling coefficient it is also simpler to implement the method in existing equipment through reprogramming.

According to another embodiment the rolling coefficient is close to one when the dive angle is below said specified dive angle, wherein the flight path continues in the forward direction. Thus it is ensured that the most efficient flight path for evading a collision with the ground is calculated when the aircraft dives with a small dive angle.

According to yet another embodiment the rolling coefficient decreases towards zero when the dive angle approaches 90 degrees, wherein the flight path turns backwards at large dive and roll angles. Thus the flight path is calculated so that the need for rolling the aircraft approaches zero degrees. This means that the flight path ascends immediately, and the direction of the calculated flight path will thus be in the same direction as the projection of the present roll angle. In addition, if the aircraft dives so that it crosses the vertical line, that is, changes its dive angle from 90° to 91°, such that the present roll angle changes abruptly with ±180 degrees, the calculation will not lead to any switches in the flight path, since the rolling need decreases towards zero degrees at dive angles close to 90°. Thus the invention leads to very stable calculated flight paths.

According to another embodiment the rolling coefficient decreases with increasing dive angle within at least one specified interval of the dive angle, so that the flight path is turned increasingly sideways with increasing dive angle. The need for rolling the aircraft thus decreases for increasing dive angles, meaning that the flight path will continuously turn more sideways within the interval. This is advantageous since it is more important to pitch the aircraft upwards at high dive angles than to roll the aircraft into a better position.

According to another embodiment the rolling coefficient decreases uniformly with increasing dive angle for said interval of the dive angle. Preferably the rolling coefficient decreases linearly with increasing dive angle for said interval of the dive angle. A rolling coefficient with such a dependency is very simple to achieve, either by calculating the rolling coefficient in a linear calculation or by retrieving a stored value of the rolling coefficient departing from the value of the dive angle.

According to yet another embodiment said interval of the dive angle ranges between said specified dive angle and 90 degrees. In one embodiment said interval of the dive angle ranges between 50 and 90 degrees, preferably between 60 and 90 degrees and most preferably between 70 and 90 degrees. These are preferred intervals, which have been found to give good performance for most aircrafts. The interval may of course be subjected to changes depending on the aircraft characteristics.

According to yet another embodiment the value of the rolling coefficient (k) is within 0 to 1. Thus a flight path is calculated in which the aircraft is not rolled to much or rolled in the wrong direction.

According to another embodiment the calculation of the flight path comprises calculating a need for changing the direction of the velocity vector after rolling the aircraft when the remaining need for rolling the aircraft is smaller than a specified need for rolling the aircraft. Thus the aircraft will be pitched upwards as soon as there is a force component in the upward direction. This is advantageous since there is a time delay before the aircraft reacts to an engagement of its rudders.

BRIEF DESCRIPTION OF THE DRAWINGS

The invention is now to be described as a non-limiting example with reference to the attached drawings.

DETAILED DESCRIPTION OF THE INVENTION

Figure 2:
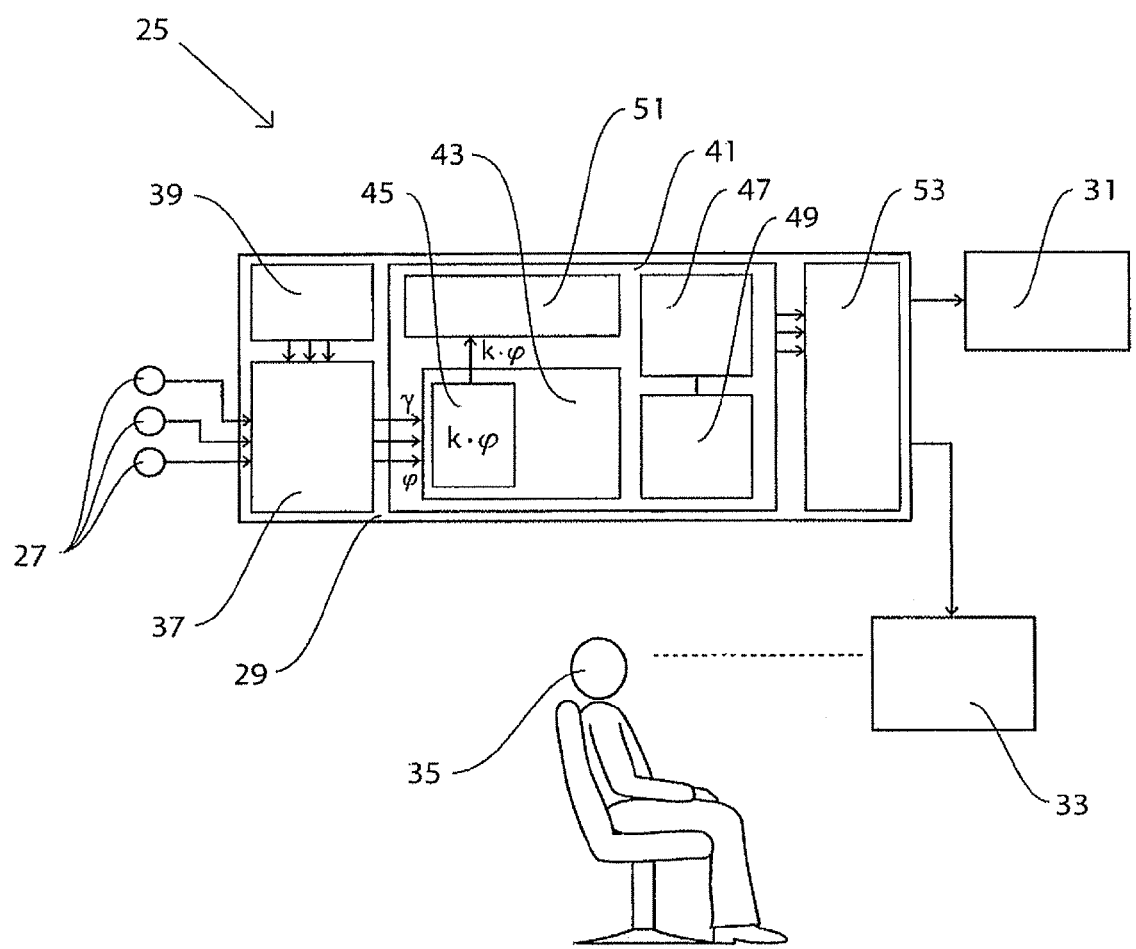
FIG. 2 shows one example of a ground collision calculating unit according to the invention.

In FIG. 2 an evasion maneuver system for calculating a recovery flight path avoiding a ground collision is shown. The evasion system comprises a number of sensors 27 arranged to provide information about parameters pertinent to the calculation of the recovery flight path. The evasion system further comprises a ground collision calculating circuit 29 arranged to calculate the recovery flight path for an aircraft in order to avoid a collision with the ground. The evasion system 25 also comprises an auto pilot 31 arranged to control the aircraft in response to signals received from the ground collision calculating circuit 29 concerning the calculated flight path, and an information presenting unit 33 arranged to present the information from the ground collision calculating circuit 29 to a pilot 35. In this example the information presentation unit 33 shows information to the pilot 35 indicating when recovery is needed and a recommended roll angel and/or dive angle. The information is in this example presented in the form of arrows in a head-up display. It should be appreciated that an evasion system 25 may comprise either or both of the autopilot 31 and the information presentation unit 33, or may incorporate some other method for using the calculated flight path.

The ground collision calculating unit 29 comprises a receiving circuit 37 arranged to receive signals comprising information about parameters needed to perform a recovery flight path calculation. In this example the receiving circuit 37 receives such signals from said sensors 27. In particular the receiving circuit 37 is arranged to receive signals containing information about a present roll angle of the aircraft, denoted by the Greek letter $\phi$, and a dive angle of the aircraft, denoted by the Greek letter $\gamma$.

In this example the ground collision calculating unit 29 also comprises a data storage 39 arranged to store information about parameters pertinent to the calculation of a flight path. The data storage 39 may for example comprise information on an electronic map of the ground, information on an imaginary ground plane, a maximum load factor for the aircraft and other performance or design parameters of the aircraft. The receiving circuit 37 is subsequently arranged to receive signals also from the data storage 39. Parameters may also be calculated within the ground collision calculating unit 29. Other parameters that may be pertinent to the calculation of the recovery flight path are the velocity vector of the aircraft, the altitude of the aircraft, the performance of the steering gears of the aircraft, and the rolling speed of the aircraft. The use of these and other parameters is known in the prior art.

The ground collision calculating unit 29 also comprises a path calculating circuit 41 arranged to calculate a flight path that avoids a collision with the ground on the basis of said information and parameters received in the receiving circuit 37. The path calculating circuit 41 comprises a first calculating module 43 arranged to calculate a need for rolling the aircraft based on the present roll angle $\phi$ and based on the dive angle $\gamma$. The path calculating circuit 41 also comprises a second calculating module 51 arranged to calculate a need for changing the direction of the velocity vector of the aircraft dependent on said roll angle $\phi$ and dive angle $\gamma$, and so that the calculated change has a component in an upward direction in relation to a reference frame of the aircraft.

Figure 4A:
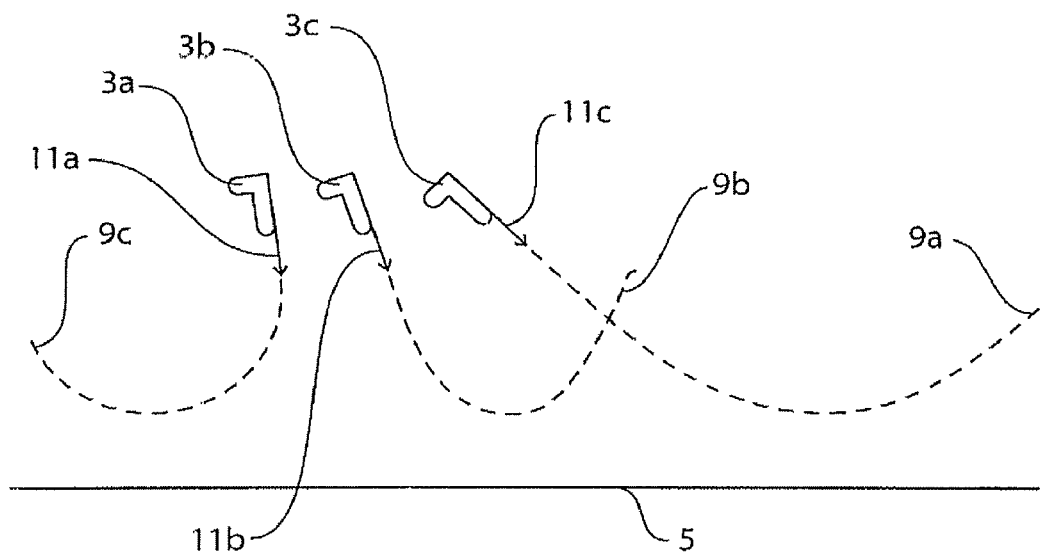
FIGS. 4a-b show flight paths calculated according to the invention.
Figure 4B:
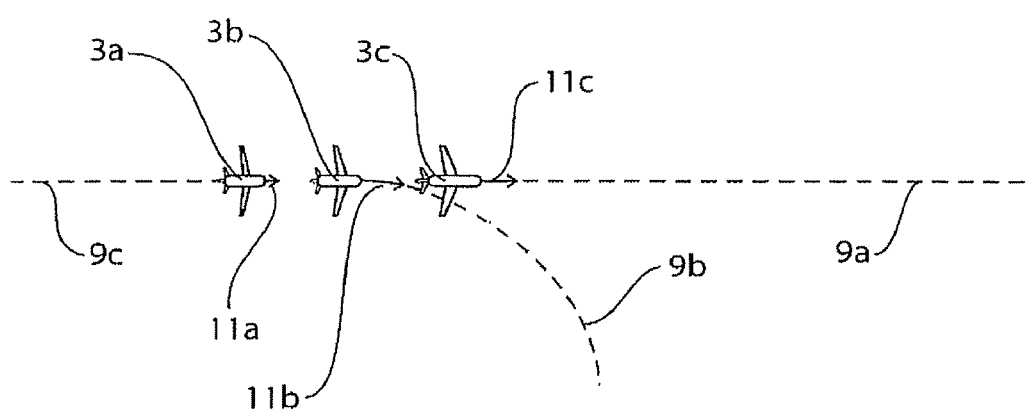
Figure 5:
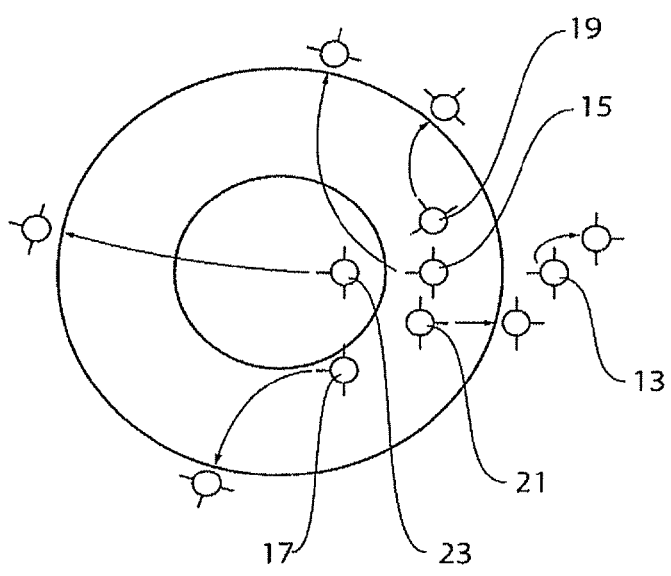
FIG. 5 shows further examples of flight paths calculated according to the invention.

The path calculating circuit 41 is adapted to calculate a recovery flight path so that the calculated flight path turns sideways when the dive angle $\gamma$ surpasses a specified dive angle $\gamma_s$ and when the present roll angle $\phi$ is larger than zero degrees. The path calculating circuit 41 is also adapted to calculate the recovery flight path dependent on the present roll angle $\phi$ and dive angle $\gamma$ so that the flight path continues in the forward direction when the dive angle $\gamma$ is below said specified dive angle $\gamma_s$, and so that the flight path turns backwards when the dive angle $\gamma$ approaches 90° for large roll angles. The general appearance of the flight paths calculated by the path calculating circuit 41 is shown in FIGS. 4a, 4b and 5.

The first calculating module 43 also comprises a roll angle modifying module 45, arranged to multiply the present roll angle $\phi$ with a rolling coefficient k. In this example the rolling coefficient k has a numerical value, which is within an interval between and including 0 and 1. The rolling coefficient k is dependent on the dive angle $\gamma$ such that the rolling coefficient k is smaller than 1 when the dive angle $\gamma$ surpasses said specified dive angle $\gamma_s$, meaning that the modified roll angle $\phi_m$, is smaller than the present roll angle $\phi$. The roll angle modifying module 45 is also arranged to forward the modified roll angle $\phi_m$ to the second calculating module 51.

The first calculating module 43 is arranged to calculate the need for rolling the aircraft as the difference between the modified roll angle $\phi_m$ and a desired final roll angle $\phi_f$. In this example the desired final roll angle $\phi_f$ is equal to zero degrees, and thus the need for rolling the aircraft is equal to the modified roll angle $\phi_m$. In one example of the invention the first calculating module and the roll angle modifying module may therefore be the same module. In yet another example of the invention the first calculating module may instead change the desired final roll angle $\phi_f$ based on the dive angle so that the need for rolling the aircraft is decreased and the calculated recovery flight path turns sideways for dive angles surpassing said specified dive angle.

The second calculating module 51 is in turn arranged to calculate the need for changing the direction of the velocity vector so that the change is initiated at a point when the remaining need for rolling the aircraft is smaller than a specified limiting need for rolling the aircraft $\phi_L$. Since the second calculating module 51 is arranged to calculate the need for changing the direction of the velocity vector so that the change in the velocity vector has a component in an upward direction in relation to a reference frame of the aircraft, the aircraft is pitched upwards. Thus the aircraft may be turned more quickly since pitching the aircraft upwards gives the most powerful steering of the aircraft. In this example the specified need for rolling the aircraft $\phi_L$ is therefore set to 90°, meaning that as soon as there is a positive component in the upward direction, which coincides with the direction of the calculated flight path, the aircraft is pitched upwards. If the modified roll angle $\phi_m$ is smaller than 90° the aircraft is pitched upwards at once.

Figure 3A:
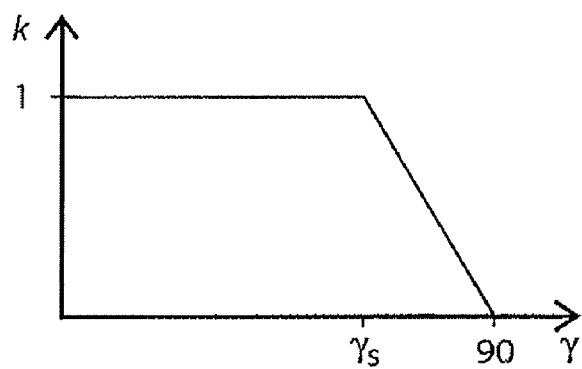
FIG. 3a shows the dependency of the rolling coefficient on the dive angle.

In FIG. 3a the relationship between the rolling coefficient k and the dive angle $\gamma$ is shown. The rolling coefficient is close to 1 when the dive angle $\gamma$ is below said specified dive angle $\gamma_s$. Thus the need for rolling the aircraft is the same as the present roll angle $\phi$, meaning that the aircraft is fully rolled to a roll angle of zero degrees, such that the flight path continues in the forward direction.

When the dive angle $\gamma$ approaches 90° the rolling coefficient k decreases towards 0, meaning that the need for rolling the aircraft approaches zero degrees, such that the recovery flight path continues in the direction in which the aircraft is presently rolled. If the aircraft dives inverted the flight path thus turns backwards similar to the flight path B of the nadir case according to the prior art.

In an interval of the dive angle, the rolling coefficient k decreases with increasing dive angle $\gamma$. In this example the specified interval of the dive angle $\gamma$ is between said specified dive angle $\gamma_s$ and 90°. Thus the recovery flight path is turned more sideways with increasing dive angle $\gamma$ within said interval, assuming that the present roll angle is larger than zero degrees, since the need for rolling the aircraft becomes smaller than the present roll angle. In this example the rolling coefficient k also decreases uniformly and linearly with increasing dive angle γ within said interval. In this example the interval of the dive angle γ ranges between 70 and 90°. In another example the rolling coefficient may decrease progressively or exponentially towards zero degrees within the interval.

The path calculating circuit also comprises an initiation calculating module 47 arranged to calculate the time and altitude at which the evasive manouvre must be initiated. In this example the initiation calculating module 47 is arranged to output an initiation signal if the lowest altitude of the error recovery flight path is below a safety altitude. In this example the safety altitude vary with the magnitude of the velocity vector and the present dive angle. The ground collision calculating unit 29 also comprises an output unit 53 arranged to receive signals from the path calculating circuit 41, including the initiation signal from the initiation calculating module 47, and transmit signals concerning the calculated recovery flight path to said auto pilot 31 or information presenting unit 33, for example in response to said initiation signal.

Figure 3B:
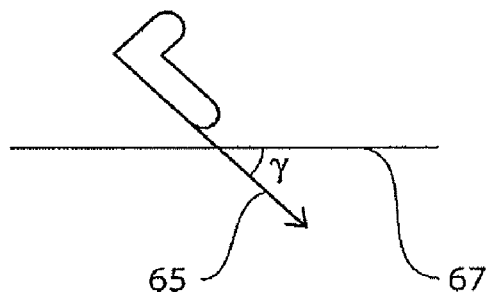
FIGS. 3b-c show definitions of the dive angle and of the present roll angle, respectively.

In FIG. 3b one example of a definition of the dive angle γ is shown. The dive angle γ is in this example defined as the angle γ between the velocity vector 65 of the aircraft and an imaginary ground plane 67. Thus a dive angle γ of zero degrees means that the aircraft is flying in parallel with the ground 67, and a dive angle γ of 90 degrees means that the aircraft is diving vertically towards the ground 67. In another example the dive angle may instead be defined as the angle between a length axis of the aircraft and an imaginary ground plane. In one example the imaginary ground plane may coincide with the true ground plane.

Figure 3C:
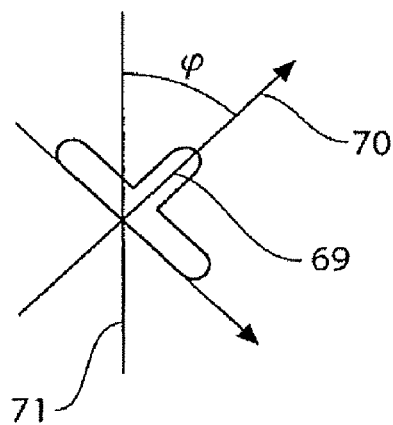

In FIG. 3c one example of a definition of the present roll angle φ is shown. The roll angle φ is in this example defined as the angle φ between the tail fin 69 of the aircraft and a vector 71, which is perpendicular to the velocity vector and which is pointing upwards, when the aircraft is projected onto the velocity vector. Thus the roll angle φ is zero degrees when the aircraft is at wings level and 180 degrees when the aircraft is inverted. When the dive angle γ is 90 degrees the roll angle φ is undefined. When the aircraft dives past the vertical line (such that the dive angle γ changes from 89 degrees to 91 degrees), the present roll angle φ changes abruptly with ±180°.

Furthermore, in FIG. 3c, a reference frame of the aircraft is shown, such that the upward direction 70 in relation to the reference frame of the aircraft is the direction in which the tail fin momentarily is pointing. If the roll angle changes the reference frame of the aircraft also changes in relation to a reference frame of the earth. For example, if the aircraft dives inverted (φ=180°) the upward direction 70 in the reference frame of the aircraft is directed downwards in relation to the reference frame of the earth. If the aircraft dives at wings level (φ=0°) the upward direction 70 in the reference frame of the aircraft coincides with the upward direction in relation to the reference frame of the earth.

It should be appreciated that the dive angle and the roll angle may be defined differently in a particular embodiment. It is then possible to transform the dive and roll angles into the definitions as given above. Thus, such an embodiment still remains within the scope of the present invention.

In FIGS. 4a-b three aircrafts 3 A-C diving inverted towards the ground 5 with different dive angles are shown. The aircrafts 3 A-C are each equipped with a ground collision calculating unit, which is arranged to calculate a flight path according to the invention, which avoids collision with the ground 5. In FIG. 4, the trajectories of the calculated flight paths 9 A-C are shown as well as the velocity vectors 11 A-C of the aircrafts 3 A-C.

According to the invention the calculation of the flight paths 9 A-C comprises calculating a need for rolling the aircrafts 3 A-C based on the present roll angle. In this case the roll angle is 180 degrees since the aircrafts are diving inverted. The calculation of the need for rolling the aircrafts 3 A-C is also based on the dive angle such that the calculated flight path turns sideways when the dive angle surpasses a specified dive angle and when the present roll angle is larger than zero degrees. The dive angle is measured in relation to an imaginary ground plane 6, which in this example is parallel to the horizontal.

Figure 1:
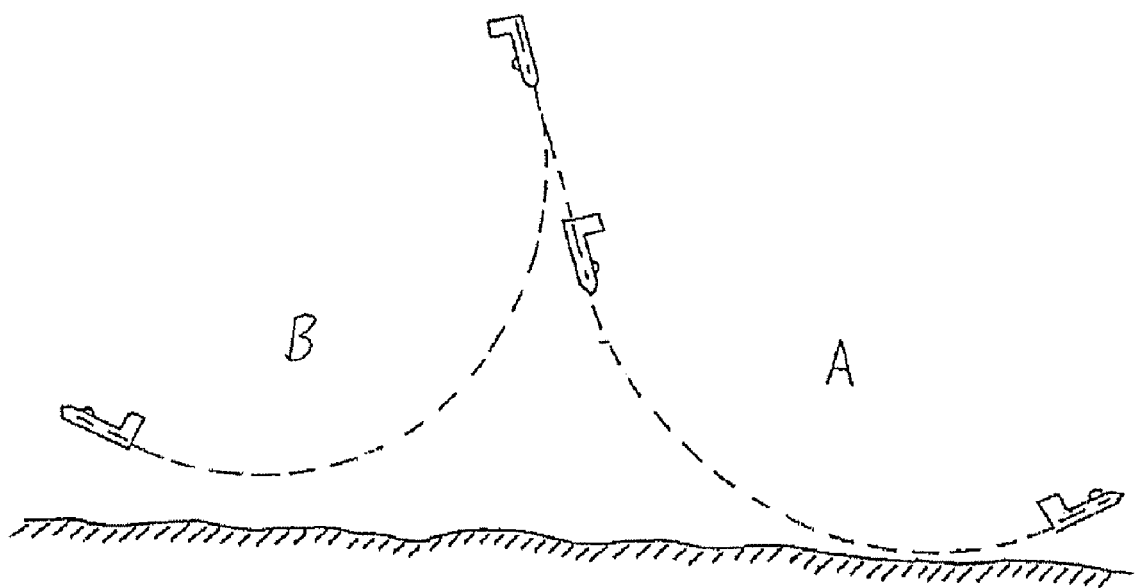
FIG. 1 shows a zenith and a nadir recovery flight path calculated according to the prior art.

In FIGS. 4a-b the aircraft 3C dives with a small dive angle below said specified dive angle. According to the invention the calculation of the need for rolling the aircraft is based on the dive angle such that the flight path continues in a forward direction when the dive angle is below said specified dive angle. Thus the flight path 9C of aircraft 3C continues in the forward direction. This flight path corresponds to the zenith flight path as described in FIG. 1.

In FIGS. 4a-b the aircraft 3B dives with a dive angle, which surpasses said specified dive angle and thus the flight path 9B turns sideways. The flight path turns sideways in relation to the forward direction of the velocity vector 11B, and in particular in relation to the direction of the projection of the velocity vector 11B onto the imaginary ground plane 6. The flight path 11B is thus intermediate to the flight paths 11A and 11 C.

In FIGS. 4a-b the aircraft 3 A dives very steeply with a dive angle approaching 90 degrees. According to the invention the need for rolling the aircraft is calculated on the basis of the dive angle such that the flight path turns backwards when the dive angle approaches 90°. Thus the flight path 9A of aircraft 3A turns backwards in relation to the forward direction of the velocity vector 11 A. This corresponds to the nadir flight path in FIG. 1.

Thus the method according to the invention, in which the calculated recovery flight path turns sideways when the dive angle surpasses a specified dive angle, includes both the nadir and the zenith flight paths according to the prior art and connect them with intermediate sideway flight paths. The method can thus be used for all dive angles and roll angles and only one calculation is needed instead of two. This reduces the need for computational power considerably and gives further advantages as mentioned previously.

In FIG. 5 different recovery flight paths for different dive angles and roll angles are shown. The circles in the figure correspond to different dive angles. The dive angle of the aircrafts is given by the aircrafts position in relation to said circles. The outer circle corresponds to a dive angle of 70°, the inner circle to a dive angle of 80°, and the dot corresponds to a dive angle of 90°. The forward direction of the velocity vectors of the aircrafts is directed to the right in FIG. 5. The present roll angles of the aircrafts are represented by the lines representing the wings and the tail fin of the aircrafts, wherein a tail fin directed to the right corresponds to a roll angle of 0°, and a tail fin directed to the left corresponds to a roll angle of 180°. In FIG. 5 said specified dive angle above which the calculated recovery flight paths are turned sideways is 70°.

The aircraft denoted by reference number 13 lies outside the outer circle and thus has a dive angle below said specified dive angle. According to the invention, the need for rolling an aircraft 13 above said specified dive angle is equal to the present roll angle, and hence aircraft 13 is rolled to 0°. When the aircraft 13 is pitched upwards the aircraft 13 thus continue its flight path in the forward direction of the velocity vector, which is represented by the bended arrow.

The aircrafts represented by reference numbers 15 and 17 have present roll angles of 180°. Their dive angles surpasses said specified dive angle of 70° and thus the calculation of the need for rolling the aircrafts 15, 17 comprises reducing the need for rolling the aircrafts below the value of the present roll angle. Thus the calculated flight paths of aircraft 15 and 17 turn sideways in relation to the direction of the velocity vectors. This comes about since the aircrafts 15, 17 are not rolled completely to a roll angle of 0°. The aircrafts then turn sideways when the aircraft is pitched upwards, since the pitching of the aircrafts will imply both a force to the side and an upward force. Since the aircraft 17 has a steeper dive angle than the aircraft 15, the flight path of the aircraft 17 will be more turned to the side and will be turned slightly backwards in comparison with the flight path of aircraft 15.

The aircraft denoted with reference number 19 has the same dive angle as the aircraft 15, but has a smaller present roll angle. Thus, the final roll angle of aircraft 19 will be smaller than the final roll angle of aircraft 15, meaning that the calculated flight path of aircraft 19 will not turn as much sideways as the flight path of aircraft 15.

The aircraft denoted by the reference number 21 also has the same dive angle as aircraft 15 and 19 but a present roll angle of 0°. Thus the need for rolling the aircraft 21 is 0. The aircraft will therefore continue its flight path in the forward direction.

The aircraft denoted by the reference number 23 has a very steep dive angle approaching 90°. Thus the need for rolling the aircraft 23 is very small, meaning that the calculated flight path of aircraft 23 will turn mostly backwards. The flight path of aircraft 23 is close to the nadir case of the prior art, and evades a collision with the ground mostly by diving even more steeply, pulling the aircraft backwards, and then ascending upwards in a loop-like flight path after the aircraft is turned beyond the 90 degree dive angle. By using the model according to the invention the calculated flight path of an aircraft with dive angle close to 90° will not flip discontinuously if the aircraft increases its dive angle to a dive angle of more than 90°, even though the present roll angle flips from 180° to 0°, when passing the vertical line, since the need for rolling the aircraft is reduced close to zero degrees at high dive angles.

Figure 6:
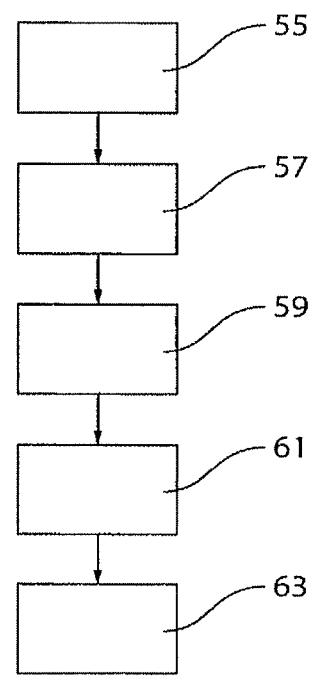
FIG. 6 shows a flow chart of an example of a method according to the invention.

In FIG. 6 a flow chart of the method according to the invention is shown. In block 55 the method comprises receiving signals comprising information of a dive angle of the aircraft and a present roll angle of the aircraft. In this example the method also comprises receiving signals comprising information on other parameters known in the art.

In block 57 to 61 the method comprises calculating a flight path that avoids collision with the ground on the basis of said information. In block 57 the method comprises calculating a need for rolling the aircraft on the basis of the present roll angle and the dive angle. The calculation comprises reducing the need for rolling the aircraft below the value of the present roll angle, when the dive angle surpasses a specified dive angle. This is carried out by retrieving a rolling coefficient from a data storage, which rolling coefficient depends on the dive angle as described previously in connection with FIGS. 2-3, and multiplying the present roll angle with said rolling coefficient. Since the rolling coefficient is smaller than 1 when the dive angle surpasses said specified dive angle, the value of the product is smaller than the present roll angle. The need for rolling the aircraft is then calculated as the product between the present roll angle and said rolling coefficient.

In block 59, the method comprises calculating a need for changing the velocity vector of the aircraft. The need for changing the velocity vector is calculated by using parameters known in the prior art, and such that the change has a component in an upward direction in relation to a reference frame of the aircraft. According to the invention the need for changing the velocity vector is also calculated such that the change is initiated at a point when the remaining need for rolling the aircraft is smaller than a specified limiting need for rolling the aircraft. In this example the limiting need for rolling the aircraft is set to 90°.

In block 61 the flight path is calculated by using said need for rolling the aircraft and said change in the velocity vector. The method further comprises calculating the lowest altitude during the flight path and the evasive maneuver, and the point at which an evasive maneuver must be initiated departing from said calculated flight path.

In block 63 the method comprises transmitting said flight path, in dependence on said lowest altitude, to an output circuit, which presents the information of the flight path at a specified time before said latest point for initiating the evasive manoeuvre. Thus a pilot or an autopilot is given time to react on the received information.

The invention is not limited to the embodiment shown but may be varied within the framework of the following claims.

What is claimed is:

1. A method performed by a calculating circuit for calculating a flight path avoiding a collision with the ground when an aircraft dives towards the ground, the method comprising:
   receiving signals comprising information of a dive angle of the aircraft in relation to an imaginary ground plane, and a present roll angle of the aircraft, and calculating a recovery flight path that avoids collision with the ground based on said information, the calculating comprising calculating a need for rolling the aircraft based on the present roll angle, and calculating a need for a change in a direction of a velocity vector of the aircraft so that the change has a component in an upward direction in relation to a reference frame of the aircraft, wherein the calculating of the need for rolling the aircraft is also based on the dive angle so that the calculated flight path turns sideways when the dive angle surpasses a specified dive angle and when the present roll angle is larger than zero degrees, and so that the flight path continues in a forward direction when the dive angle is below said specified dive angle.

2. The method according to claim 1, wherein the calculating of the need for rolling the aircraft comprises reducing the need for rolling the aircraft below the value of the present roll angle when the dive angle surpasses said specified dive angle.

3. The method according to claim 1, wherein the calculating of the need for rolling the aircraft comprises multiplying the present roll angle of the aircraft with a rolling coefficient which has a numerical value which is dependent on the dive angle so that the rolling coefficient is smaller than one when the dive angle surpasses said specified dive angle.

4. The method according to claim 3, wherein the rolling coefficient is close to one when the dive angle is below said specified dive angle, wherein the flight path continues in the forward direction.

5. The method according to claim 3, wherein the rolling coefficient decreases towards zero when the dive angle approaches 90 degrees, wherein the flight path turns backwards when the roll angle is close to 180 degrees.

6. The method according to claim 3, wherein the rolling coefficient decreases with increasing dive angle within at least one specified interval of the dive angle, such that the flight path is turned increasingly sideways with increasing dive angle.

7. The method according to claim 6, wherein the rolling coefficient decreases uniformly with increasing dive angle for said interval of the dive angle.

8. The method according to claim 6, wherein said interval of the dive angle ranges between 50 and 90 degrees.

9. The method according to claim 3, wherein the value of the rolling coefficient is within 0 to 1.

10. The method according to claim 1, wherein the calculating of the flight path comprises calculating a need for changing the direction of the velocity vector after rolling the aircraft when the remaining need for rolling the aircraft is smaller than a specified need for rolling the aircraft.

11. A non-transitory computer readable medium having a computer program product directly loadable into the internal memory of a digital computer, comprising
program code for calculating a flight path for avoiding a collision with the ground when an aircraft dives towards the ground and comprises sets of instructions for:

receiving signals comprising information of a dive angle of the aircraft in relation to the imaginary ground plane, and a present roll angle of the aircraft; and calculating a recovery flight path that avoids collision with the ground on the basis of said information, the calculation comprising calculating a need for rolling the aircraft based on the present roll angle, and calculating a need for changing the direction of the velocity vector of the aircraft so that the change has a component in an upward direction in relation to a reference frame of the aircraft, wherein the calculation of the need for rolling the aircraft is also based on the dive angle so that the calculated flight path turns sideways when the dive angle surpasses a specified dive angle and when the present roll angle is larger than zero degrees, and so that the flight path continues in a forward direction when the dive angle is below said specified dive angle.

* * * * *